US012676823B1

(12) United States Patent
Bodla et al.

(10) Patent No.: US 12,676,823 B1
(45) Date of Patent: Jul. 7, 2026

(54) DYNAMICALLY PROVISIONING RESOURCES FOR DETECTING ANOMALIES IN TIME SERIES DATA USING MACHINE LEARNING MODELS

(71) Applicant: Amazon Technologies, Inc., Seattle, WA (US)

(72) Inventors: Ranjith Kumar Bodla, Snohomish, WA (US); Lakshay Kharbanda, Seattle, WA (US); Sadanand Murthy Sachidananda, Bothell, WA (US); Ashutosh Gupta, Seattle, WA (US); Gaurav Rajendra Kataria, Lynnwood, WA (US); Ketan Vijayvargiya, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/364,823

(22) Filed: Jun. 30, 2021

(51) Int. Cl.
| | |
|---|---|
| *G06F 15/173* | (2006.01) |
| *G06F 18/214* | (2023.01) |
| *H04L 47/70* | (2022.01) |
| *H04L 47/765* | (2022.01) |
| *H04L 47/78* | (2022.01) |

(52) U.S. Cl.
CPC .......... *H04L 47/765* (2013.01); *G06F 18/214* (2023.01); *H04L 47/788* (2013.01); *H04L 47/827* (2013.01); *H04L 47/828* (2013.01)

(58) Field of Classification Search
CPC ... H04L 47/765; H04L 47/788; H04L 47/827; H04L 47/828; G06K 9/6256

USPC .......................................................... 709/226
See application file for complete search history.

(56) References Cited

U.S. PATENT DOCUMENTS

| | | | | | |
|---|---|---|---|---|---|
| 10,248,561 | B2 * | 4/2019 | Garvey | .............. | G06F 11/3419 |
| 11,055,443 | B1 * | 7/2021 | Ling | ......................... | G06N 3/08 |
| 11,082,439 | B2 * | 8/2021 | Salunke | .............. | G06F 11/3423 |
| 11,157,782 | B2 * | 10/2021 | Bathen | .................... | G06N 3/044 |
| 11,263,172 | B1 * | 3/2022 | Chang | ................... | G06F 16/128 |
| 11,381,583 | B1 * | 7/2022 | Ellis | ...................... | H04L 63/1425 |
| 11,610,121 | B2 * | 3/2023 | Teppoeva | ........... | G06F 16/2477 |
| 11,803,773 | B2 * | 10/2023 | Arnold | ................ | G06F 11/0709 |
| 11,902,309 | B1 * | 2/2024 | Nagarajan | ........... | H04L 43/0805 |
| 2007/0143453 | A1 * | 6/2007 | Huang | ................ | H04L 41/5067 |
| | | | | | 709/220 |
| 2011/0208668 | A1 * | 8/2011 | Phillips | .............. | G06Q 30/0282 |
| | | | | | 705/347 |
| 2012/0264380 | A1 * | 10/2012 | Cobley | ................. | H03F 1/0222 |
| | | | | | 455/77 |
| 2013/0110761 | A1 * | 5/2013 | Viswanathan | .... | G06F 16/24578 |
| | | | | | 706/52 |
| 2014/0296057 | A1 * | 10/2014 | Ho | ............................. | B01J 8/02 |
| | | | | | 502/22 |
| 2016/0219071 | A1 * | 7/2016 | Vasseur | ............... | H04L 63/1425 |
| 2016/0295604 | A1 * | 10/2016 | Ohta | ........................ | H04L 5/001 |

(Continued)

*Primary Examiner* — Thuong Nguyen
(74) *Attorney, Agent, or Firm* — S. Scott Foster; Kowert, Hood, Munyon, Rankin & Goetzel, P.C.

(57) ABSTRACT

Computing resources for anomaly detection on time series data using a machine learning model may be dynamically provisioned. An expected workload of anomaly detection on time series data is determined in order to determine a number of computing resources. The number of computing resources are provisioned for anomaly detection and updated when the machine learning model is re-trained.

20 Claims, 8 Drawing Sheets

(56) References Cited

U.S. PATENT DOCUMENTS

| | | | | |
|---|---|---|---|---|
| 2017/0094527 | A1* | 3/2017 | Shattil | H04K 3/92 |
| 2017/0149687 | A1* | 5/2017 | Udupi | H04L 47/83 |
| 2017/0155537 | A1* | 6/2017 | Maheshwari | H04L 41/064 |
| 2017/0279834 | A1* | 9/2017 | Vasseur | H04L 41/147 |
| 2018/0083833 | A1* | 3/2018 | Zoll | G06F 18/214 |
| 2018/0316707 | A1* | 11/2018 | Dodson | H04L 43/20 |
| 2019/0050567 | A1* | 2/2019 | Chistyakov | G06F 21/566 |
| 2019/0122258 | A1* | 4/2019 | Bramberger | G06N 3/08 |
| 2019/0195742 | A1* | 6/2019 | Erickson | G05B 23/024 |
| 2019/0197425 | A1* | 6/2019 | Yuan | G06F 17/15 |
| 2019/0293697 | A1* | 9/2019 | Gross | G01R 19/2513 |
| 2019/0312898 | A1* | 10/2019 | Verma | G06N 5/022 |
| 2019/0324881 | A1* | 10/2019 | Buffone | G06F 11/0751 |
| 2020/0193234 | A1* | 6/2020 | Pai | G06F 16/904 |
| 2020/0250572 | A1* | 8/2020 | Kajino | G06F 17/17 |
| 2020/0267057 | A1* | 8/2020 | Garvey | H04L 41/0816 |
| 2020/0344314 | A1* | 10/2020 | Mellqvist | H04W 84/18 |
| 2021/0081492 | A1* | 3/2021 | Higginson | G06N 20/00 |
| 2021/0092026 | A1* | 3/2021 | Di Pietro | H04L 41/16 |
| 2021/0191935 | A1* | 6/2021 | Bhave | G06F 16/24568 |
| 2021/0203680 | A1* | 7/2021 | Das | G06F 18/214 |
| 2021/0227014 | A1* | 7/2021 | Boukhtouta | H04W 4/029 |
| 2021/0321956 | A1* | 10/2021 | Palpanas | G06F 17/18 |
| 2021/0342688 | A1* | 11/2021 | Wang | G06V 10/764 |
| 2022/0035357 | A1* | 2/2022 | Elbsat | G06N 3/088 |
| 2022/0052905 | A1* | 2/2022 | Vasseur | H04L 41/0654 |
| 2022/0058174 | A1* | 2/2022 | Lemberg | G06F 11/3075 |
| 2022/0103418 | A1* | 3/2022 | Acharjee | G06N 20/00 |
| 2022/0114437 | A1* | 4/2022 | Watt | G06N 3/042 |
| 2022/0174342 | A1* | 6/2022 | Gershey | H04N 21/26291 |
| 2022/0198305 | A1* | 6/2022 | Fotak | G06N 7/01 |
| 2022/0214948 | A1* | 7/2022 | Yeddu | G06F 11/3476 |
| 2022/0291953 | A1* | 9/2022 | Malvankar | G06F 11/3072 |
| 2022/0291989 | A1* | 9/2022 | Wang | H04L 41/0631 |
| 2022/0335257 | A1* | 10/2022 | Arpit | G06V 10/751 |
| 2022/0345473 | A1* | 10/2022 | Kare | H04L 63/1425 |
| 2022/0382857 | A1* | 12/2022 | Liu | G06F 21/552 |
| 2022/0398097 | A1* | 12/2022 | Smith | G06Q 10/06313 |
| 2022/0414663 | A1* | 12/2022 | Anthony | G06Q 20/4016 |
| 2023/0214308 | A1* | 7/2023 | Chen | G06F 9/505 |
| | | | | 718/104 |

* cited by examiner

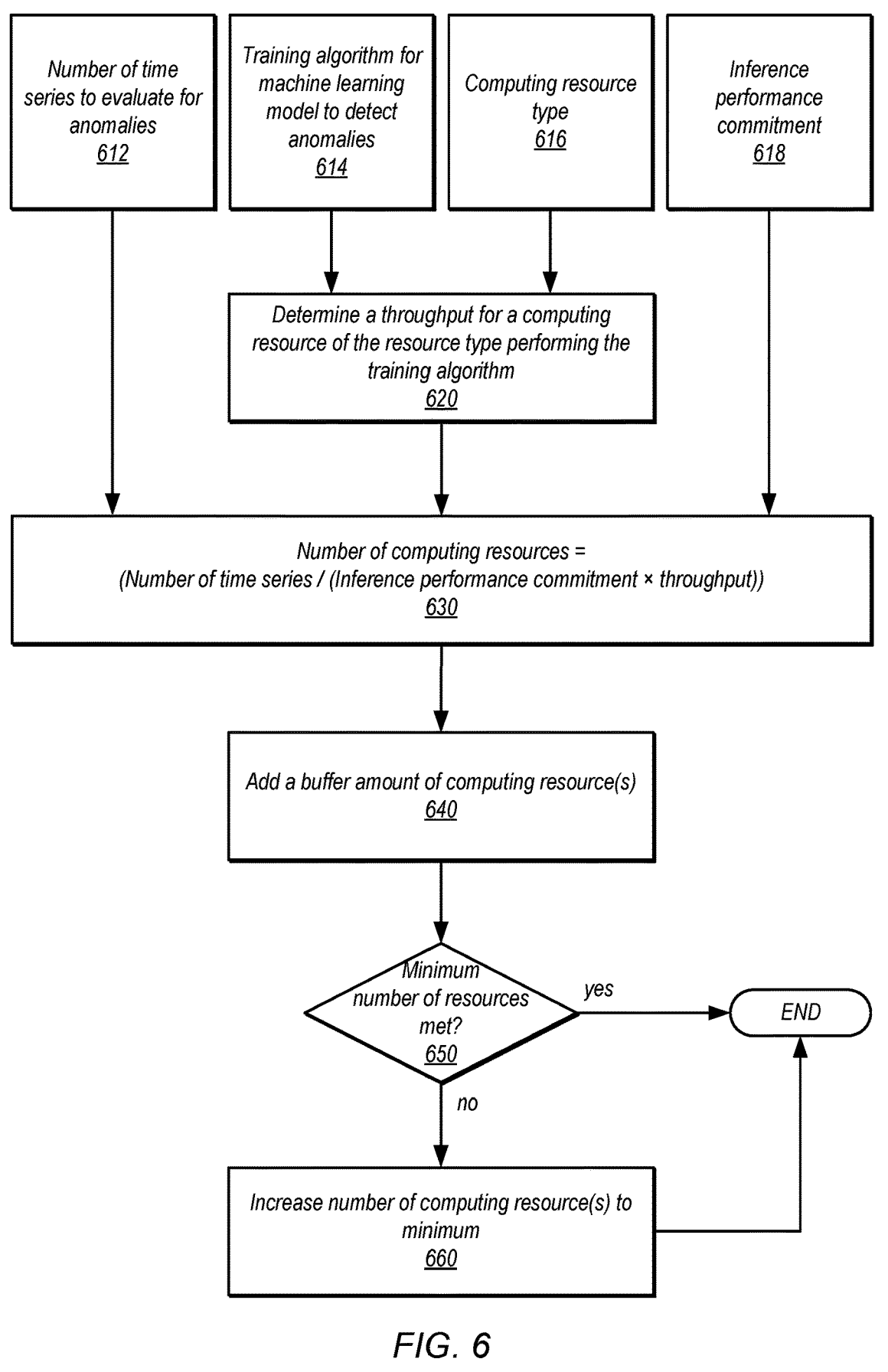

Number of time series to evaluate for anomalies
612

Training algorithm for machine learning model to detect anomalies
614

Computing resource type
616

Inference performance commitment
618

Determine a throughput for a computing resource of the resource type performing the training algorithm
620

Number of computing resources =
(Number of time series / (Inference performance commitment × throughput))
630

Add a buffer amount of computing resource(s)
640

Minimum number of resources met?
650 yes

END no

Increase number of computing resource(s) to minimum
660

*FIG. 6*

DYNAMICALLY PROVISIONING RESOURCES FOR DETECTING ANOMALIES IN TIME SERIES DATA USING MACHINE LEARNING MODELS

BACKGROUND

Machine learning models are increasingly used in various applications. Different types of data, such as time series data, may be used to create machine learning models. Moreover, many different techniques may be used to create machine learning models. Therefore, different techniques for selecting how to create machine learning models are also utilized.

BRIEF DESCRIPTION OF THE DRAWINGS

FIG. 6 illustrates a high-level flowchart of various methods and techniques to determine a number of computing resources for detecting anomalies from an expected workload, according to some embodiments.

Figure 1:
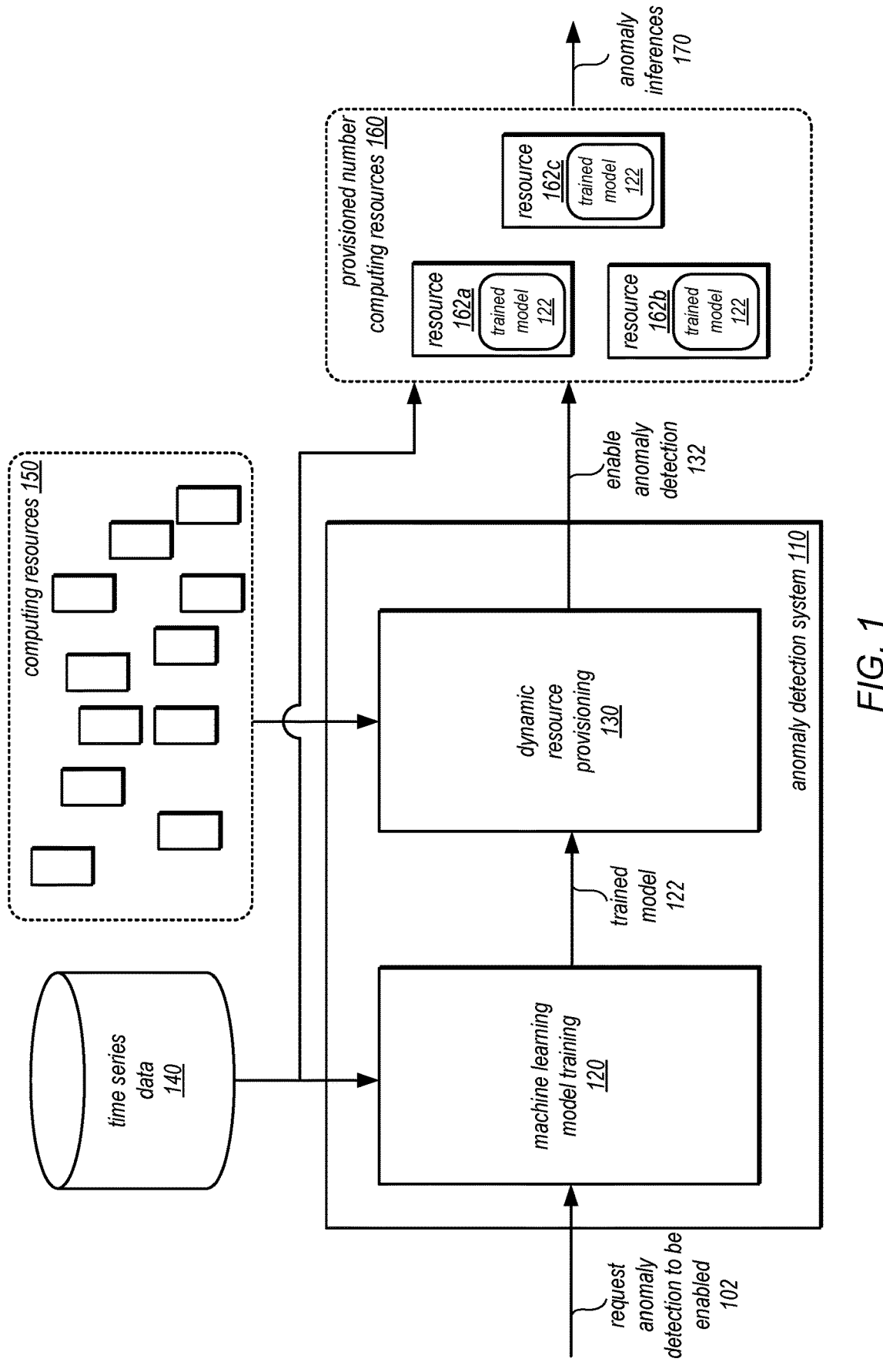
FIG. 1 illustrates a logical block diagram of dynamically provisioning computing resources for detecting anomalies in time series data using machine learning models, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms.

These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of dynamically provisioning computing resources for detecting anomalies in time series data using machine learning models are described herein. Time series data, which may describe various actions, events, or other data points corresponding to points in time, may offer valuable insights into the performance of various systems, services, applications, or organizations. Anomalies (e.g., errors, unexpected values, or other changes) in time series data may point to service, application, or other system scenarios or issues that may become important issues to address. A technical error in an application, for example, could be indicated by a change in metrics or values emitted for the application. Anomalies may indicate changes in client or other user behavior that affect performance of a system, service, or application, such as an increased demand for various computational services (e.g., indicated by a changing number of request), which may impact system performance or user experience if not addressed.

Machine learning models may offer improvements to the detection of anomalies in time series data. Machine learning may refer to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time. The application of machine learning models to provide inferences to detect anomalies in time series data may provide performance improvements for anomaly detection systems (e.g., in terms of accuracy and efficiency).

Implementation of machine learning techniques for anomaly detection is not without costs. Computing resources to implement machine learning techniques may, for example, involve utilizing one or more multiple physical and/or virtual computing resources to train machine learning models and apply trained machine learning models to detect time series data anomalies. Failure to accurately provision the number of computing resources may cause performance degradation for client systems or an anomaly detection system. For example, in scenarios where an insufficient number of computing resources is provisioned for performing anomaly detection, anomaly detection may lag input of new time series data such that anomalies are not detected with enough time to address a root cause of the anomaly. In other scenarios, an excess number of computing resources in an anomaly detection system may cause resource insufficiency for other anomaly detection tasks (e.g., on behalf of other clients, users, accounts, etc.). In various embodiments, techniques for dynamically provisioning computing resources for detecting anomalies in time series data using machine learning models may be implemented to prevent scenarios of performance degradation in anomaly detection systems by dynamically determining (and updating) computing resources provisioned for different anomaly detection workloads. In this way, scenarios of insufficient resources and excess resources may be avoided, improving performance of an anomaly detection system overall.

FIG. 1 illustrates a logical block diagram of dynamically provisioning computing resources for detecting anomalies in time series data using machine learning models, according to some embodiments. Anomaly detection system 110 may implement various techniques for creating and using machine learning models to evaluate time series data for anomalies, as discussed in detail below with regard to FIGS. 2-7. For example, anomaly detection system 110 (e.g., computing system 1000 in FIG. 8 or multiple computing systems, such as those that may implement an anomaly detection service 210 in FIG. 2) may implement an interface to receive a request for anomaly detection to be enabled, as indicated at 102, in order to create, train, and deploy a machine learning model for evaluating time series data for anomalies. In some embodiments, anomaly detection system 110 may also host, deploy, or implement the model to generate detect anomalies using the trained model.

Request 102 may indicate the time series data 140 (e.g., from one or multiple database, data storage systems, reporting systems, data streaming systems, or other sources of time series data), in some embodiments. Various features of the anomaly detection to be applied, such as the features, attributes, and/or dimensions in time series data 140, interval and/or frequency of new time series data, requested performance minimums, and/or various other information for performing anomaly detection may be provided as part of request 102. Anomaly detection system 110 may implement machine learning model training 120, which may implement one or multiple machine learning techniques to train a machine learning model for time series data 140. For example, machine learning model training 120 may implement supervised training techniques on historical time series data, which may utilize labeled anomalies in the historical time series data to create a machine learning model that can detect anomalies. Machine learning model training 120 may implement unsupervised learning techniques to train machine learning model without historical time series data (e.g., as time series data is received for a training period, the time series data may be evaluated (e.g., without anomaly labeling) to train a machine learning model to detect anomalies).

A trained model 122 may be deployed to perform anomaly detection on time series data 140. Anomaly detection system 110 may implement dynamic resource provisioning 130 to determine a number of computing resources 150 which should be provisioned to host and apply trained model 122. For example, as discussed in detail below with regard to FIGS. 5 and 6, an expected workload for anomaly detection may be used to determine the number of computing resources 162a, 162b, and 162c. Various aspects of this determination may include the expected or minimum performance of anomaly detection, the capacity of different computing resources to perform anomaly detection using different types of models (e.g., throughput of resources applying model type Y), and a number of time series within time series data (e.g., 3,000 time series) to monitor, evaluate, and/or detect anomalies in.

Various different types of computing resources 150 may be considered. For example, computing resources 150 may be different numbers of servers, hosts, instances (as discussed in detail below with regard to FIGS. 2-4), or other physical and/or virtual resources (e.g., allocations of memory, processor, storage, network bandwidth, containers, etc.) which can be provisioned for and used to apply trained model 122. As indicated at 132, anomaly detection system 110 may enable anomaly detection at the provisioned resources 160, (e.g., computing resources 162a, 162b, and 162c) respectively using trained model 122. Provisioned number of computing resources 160 may be homogeneous, with the same available capacities, capabilities, or other characteristics, in some embodiments, and in other embodiments may be heterogeneous, with some difference in available capacities, capabilities, or other characteristics. Time series data 140 may then be evaluated (e.g., periodically, continuously, or some other pattern of input to provisioned number of computing resources 160), to provide anomaly inferences 170. Anomaly inferences 170 may identify individual anomalies along with respective confidence values and/or groups of anomalies (e.g., anomalies of different and/or related types) with respective confidence values, in some embodiments.

Please note that the previous description of an anomaly detection system, time series data, computing resources, and various other requests is a logical illustration and thus is not to be construed as limiting as to the implementation of dynamically provisioning computing resources for detecting anomalies in time series data using machine learning models.

This specification begins with a general description of a provider network that implements multiple different services, including an anomaly detection service that may implement dynamically provisioning computing resources for detecting anomalies in time series data using machine learning models. Then various examples of the anomaly detection service, including different components/modules, or arrangements of components/module that may be employed as part of implementing the anomaly detection service are discussed. A number of different methods and techniques to implement dynamically provisioning computing resources for detecting anomalies in time series data using machine learning models are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
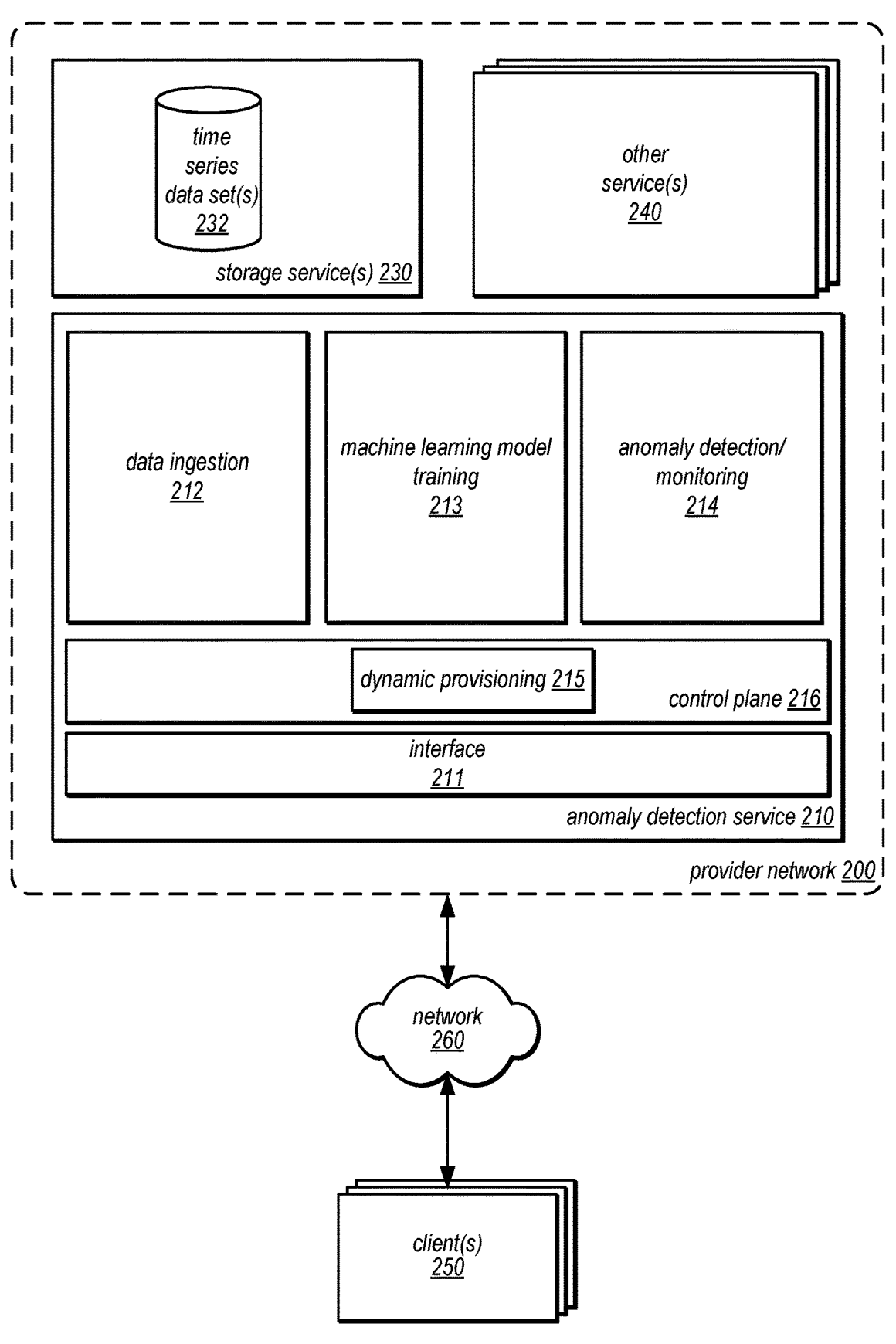
FIG. 2 illustrates an example provider network that may implement an anomaly detection service that may implement dynamically provisioning computing resources for detecting anomalies in time series data using machine learning models, according to some embodiments.

FIG. 2 illustrates an example provider network that may implement an anomaly detection service that may implement dynamically provisioning computing resources for detecting anomalies in time series data using machine learning models, according to some embodiments. Provider network 200 may be a private or closed system, or may be set up by an entity such as a company or a public sector organization to provide one or more services (such as various types of cloud-based storage) accessible via the Internet and/or other networks to clients 250, in one embodiment. Provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. Provider network 200 can provide convenient, on-demand network access to a shared pool of configurable computing resources that can be programmatically provisioned and released in response to customer commands. These resources can be dynamically provisioned and reconfigured to adjust to variable load. For example, in some embodiments, provider network 200 may implement various computing resources or services, such as object machine learning model-based search service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of machine learning model-based search service 210 may be implemented by a particular node or may be distributed across several nodes. In some embodiments, a given node may implement the functionality of more than one service system component (e.g., more than one data store component).

Anomaly detection service 210 may implement interface 211 to allow clients (e.g., client(s) 250 or clients implemented internally within provider network 200, such as a client application hosted on another provider network service like an event driven code execution service or virtual compute service) to send request to enable or view results of anomaly detection in time series data (e.g., using specific techniques as discussed in detail below) or obtain a prediction using a prediction model. For example, anomaly detection service 210 may implement interface 211 (e.g., a graphical user interface, programmatic interface that implements Application Program Interfaces (APIs) and/or a command line interface) may be implemented so that a client can request submit various requests, including the enablement and viewing of anomalies as discussed in detail below with regard to FIG. 3.

Anomaly detection service 210 may implement data set ingestion 212, as discussed in detail below with regard to FIG. 3, in various embodiments. Data set ingestion 212 may obtain or otherwise access time series data (e.g., time series data set(s) 232 in storage service(s) 230) to train and/or detect for various anomalies. These detections may be returned in text (e.g., in files, such as Comma Separated Values (CSV) files), via a programmatic interface (e.g., to be incorporated into other applications to use anomaly detection), warnings/alerts/notifications, and/or using various visualization techniques (e.g., graph displays).

Anomaly detections service 210 may implement machine learning model training 213, as discussed in detail below with regard to FIGS. 3 and 4, in some embodiments. Machine learning model training 213 may implement various training techniques, such as supervised or unsupervised training techniques to train machine learning models to detect anomalies in given time series data. Anomaly detection service 210 may implement anomaly detection/monitoring 214, as discussed in detail below with regard to FIGS. 3 and 4, to use provisioned computing resources to apply trained machine learning models to detect anomalies.

Anomaly detection service 210 may implement control plane 216, in various embodiments, to manage and/or orchestrate the performance of various features of anomaly detection service, such as data ingestion 212, machine learning model training 213, and anomaly detection and/or monitoring 214. For example, various workload management, security management, identity management, and/or other control functions may be handled by control plane 216. As discussed in detail below with regard to FIGS. 3 and 4, dynamic provisioning 215 may be implemented as part of control plane 215 to determine and provision a number of computing resources for detecting anomalies using machine learning models for time series data.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of time series data set(s) 232, which may be accessed by and used for time series forecasting service 210. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for time series forecasting service 210 (e.g., a request to enable anomaly detection or view detected anomalies, etc.). For example, a given client 250 may include a suitable version of a web browser, or may include a plug-in module or other type of code module that can execute as an extension to or within an execution environment provided by a web browser. Alternatively, a client 250 may encompass an application such as an application that may make use of time series forecasting service 210 to implement various applications. For example, a client 250 may utilize a prediction model 234 hosted deployed by model-based time series prediction 212 in order to obtain a prediction of time series data, which may be sent via interface 211. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
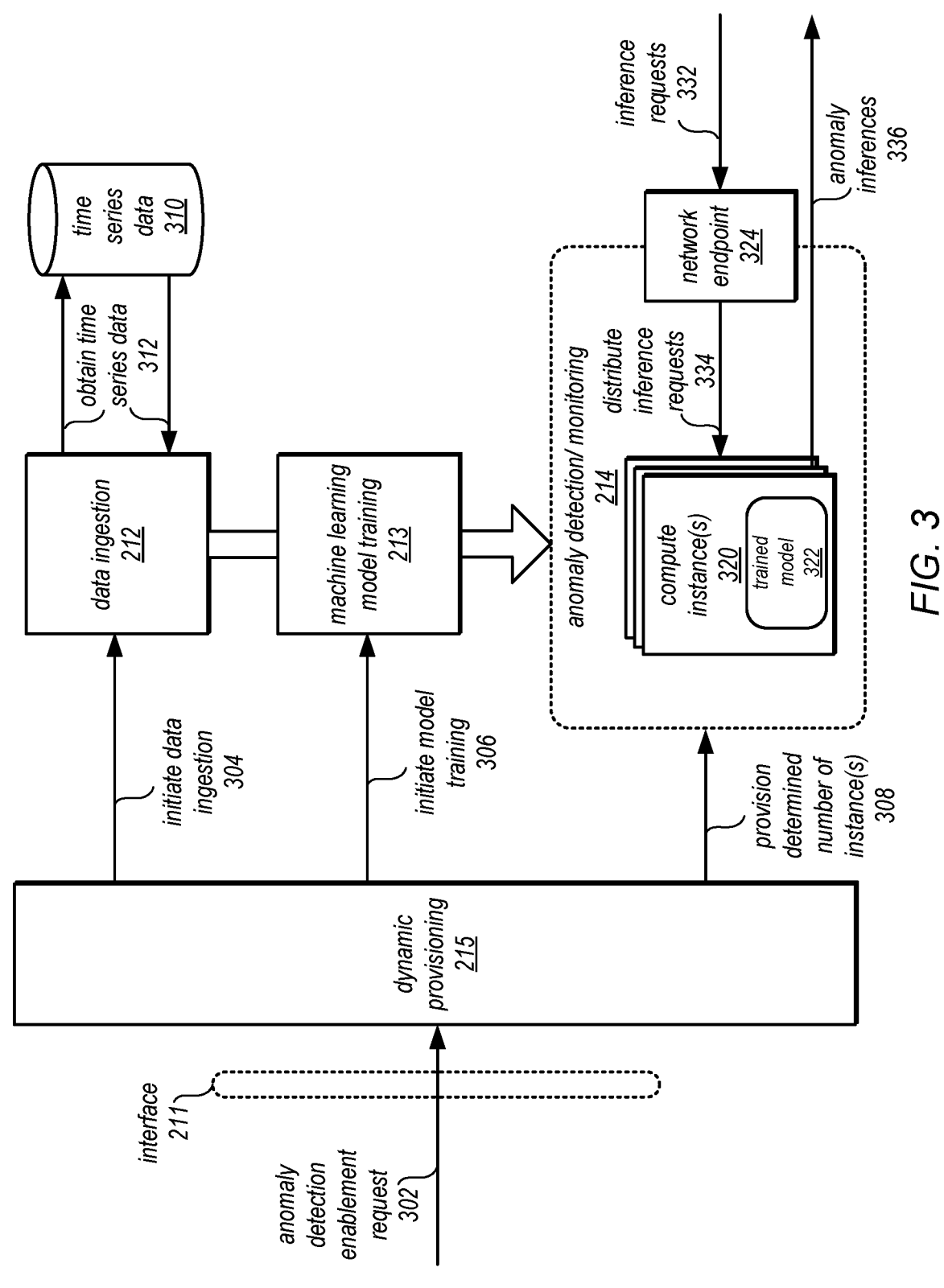
FIG. 3 illustrates a logical block diagram illustrating requests to enable anomaly detection for time series data, according to some embodiments.

FIG. 3 illustrates a logical block diagram illustrating requests to enable anomaly detection for time series data, according to some embodiments. As indicated 302, a request to enable anomaly detection may be received via interface 211. The request may be received through various types of interfaces, like a programmatic, graphical, or command-line, among others. The request may indicate the time series data (e.g., from one or multiple database, data storage systems, reporting systems, data streaming systems, or other sources of time series data), in some embodiments. Various features of the anomaly detection to be applied, such as the features, attributes, and/or dimensions in time series data, interval and/or frequency of new time series data, requested performance minimums, and/or various other information for performing anomaly detection may be provided as part of the request 302.

Dynamic provisioning 215 may initiate data ingestion 304 at data ingestion 212. For example, data ingestion 212 may obtain time series data 312 from the source of time series data 310, in some embodiments. Dynamic provisioning may initiate model training 306 to machine learning model training 213, in some embodiments. For example, dynamic provisioning 215 may configure or otherwise set up communications from data ingestion state to receive time series data 310 for training a machine learning model. Dynamic provisioning 215 may then determine (e.g., using the techniques discussed below using FIGS. 5 and 6) the number of instances (or various other computing resources) and provision them, as indicated at 308 as part of anomaly detection monitoring 214. For example, a number of compute instances 320 hosting the trained model 322 may sit behind network endpoint 324. Network endpoint 324 may act as a receiving point for inference requests 332, which may be distributed 334 (e.g., according to a load balancing scheme) to compute instances 320. Anomaly inferences 336 may be returned and may include respective scores or other confidence values, in some embodiments.

Figure 4:
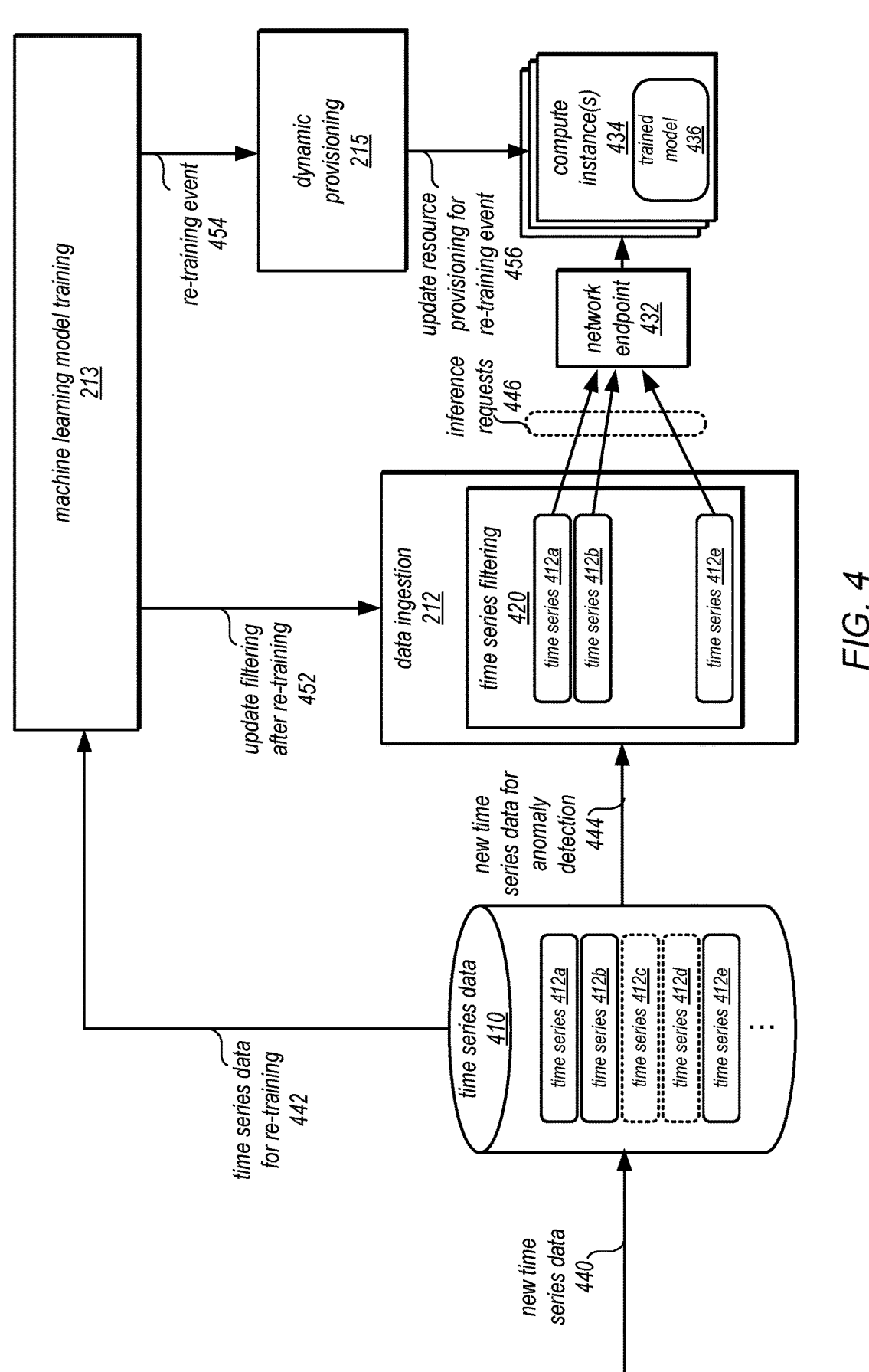
FIG. 4 illustrates a logical block diagram illustrating evaluating time series data using provisioned resources to detect anomalies, according to some embodiments.

FIG. 4 illustrates a logical block diagram illustrating evaluating time series data using provisioned resources to detect anomalies, according to some embodiments. As indicated at 440, new time series data may be added to time series data 410 that has anomaly detection enabled. For example, different time series 412a, 412b, 412c, 412d, and 412e, may be included as part of time series data 410. At the last training time, not all time series may be present. For example, the time series outlined in dotted line, 412c and 412d, may not have been present when last trained. When data ingestion 212 obtains new time series data, data ingestion 212 may implement time series filtering 420, which may only perform anomaly detection for those time series present at last training (e.g., 412a, 412b, and 412e). For example, an identifier may be assigned to each time series 412. If, at time series filtering 420, an identifier for a time series with new data is not included on a current listing or index of time series data for anomaly detection, then those time series may not have inference requests generated and sent.

In some embodiments, data ingestion 212 may perform inference requests 446 for those non-filtered time series. In some embodiments, data ingestion 212 may perform inference requests in accordance with a maximum concurrency, as determined below with regard to FIG. 7. Inference requests may be made to network endpoint 432, which may implement a load balancer or other component to distribute requests to different compute instances 434 applying trained model 436.

In order to handle the new time series data (e.g., both new time series and updates to existing time series), the time series data may be provided, as indicated at 442, for re-training to machine learning model training 213. Machine learning model training 213 may update the filtering after re-training, as indicated at 452. In this way, for example, time series 412c and 412d may no longer be filtered.

As indicated 454, a re-training event 454 may be indicated to dynamic provisioning 215. Dynamic provisioning 215 may perform similar techniques to those discussed above and below to determine a number of computing instances 434. If the number should change as a result of the re-training event (which it may not change in other scenarios), then an updated to resource provisioning for the re-training event 456 may be performed. This may result in shift work to a new group of instances and/or adding/removing instances to an existing group.

Although FIGS. 2-4 have been described and illustrated in the context of a provider network implementing an anomaly detection service, the various components illustrated and described in FIGS. 2-4 may be easily applied to other systems that utilize anomaly detection. As such, FIGS. 2-4 are not intended to be limiting as to other embodiments of dynamically provisioning computing resources for detecting anomalies in time series data using machine learning models.

Figure 5:
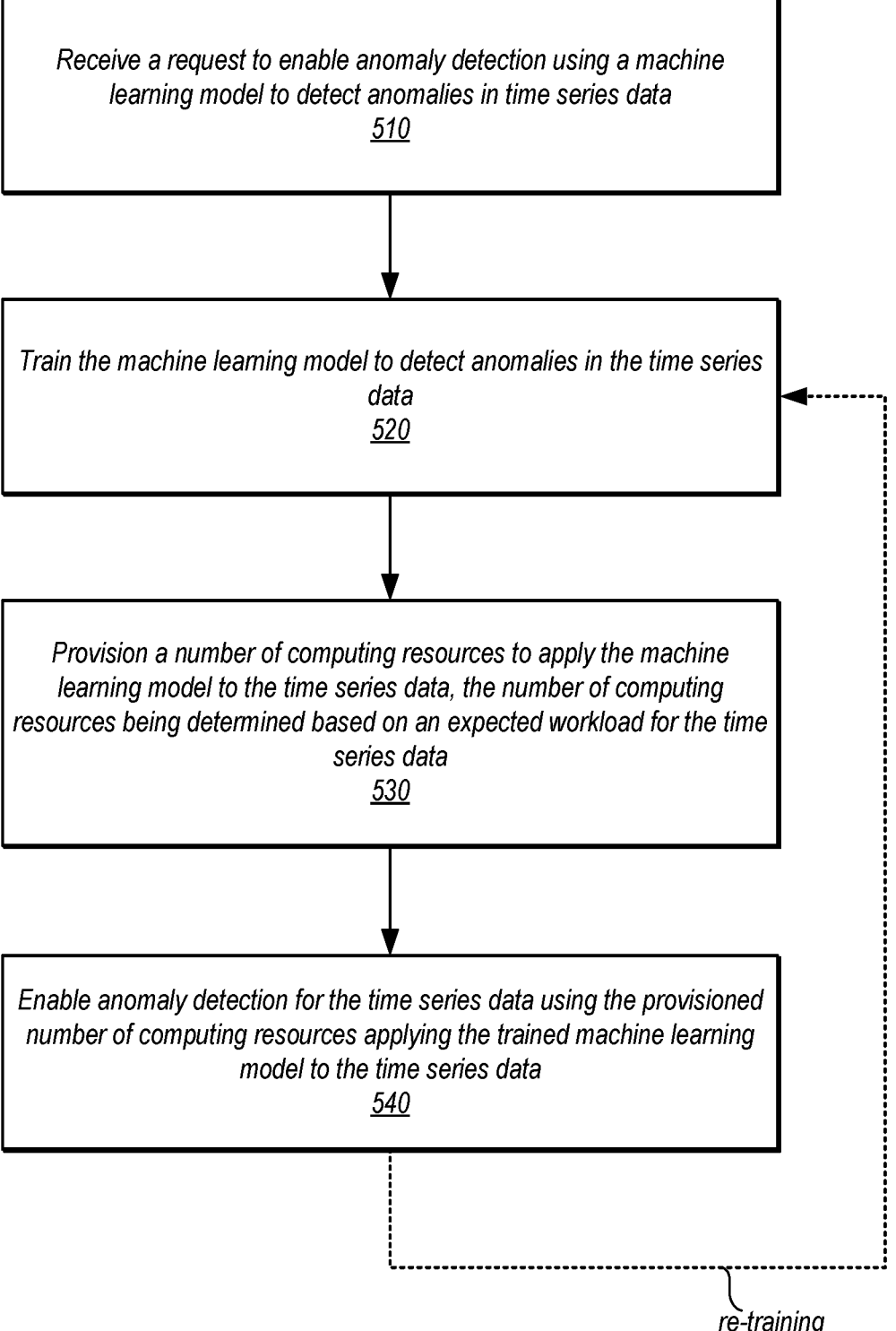
FIG. 5 illustrates a high-level flowchart of various methods and techniques to implement dynamically provisioning computing resources for detecting anomalies in time series data using machine learning models, according to some embodiments.

FIG. 5 illustrates a high-level flowchart of various methods and techniques to implement dynamically provisioning computing resources for detecting anomalies in time series data using machine learning models, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 510, a request to enable anomaly detection using a machine learning model to detect anomalies in time series data may be received, in various embodiments. The request may be received through various types of interfaces, like a programmatic, graphical, or command-line, among others. The request may indicate the time series data (e.g., from one or multiple database, data storage systems, reporting systems, data streaming systems, or other sources of time series data), in some embodiments. Various features of the anomaly detection to be applied, such as the features, attributes, and/or dimensions in time series data, interval and/or frequency of new time series data, requested performance minimums, and/or various other information for performing anomaly detection may be provided as part of the request.

As indicated at 520, the machine learning model may be trained to detect anomalies in the time series data 520. For example, supervised training techniques on historical time series data, which may utilize labeled anomalies in the historical time series data to create a machine learning model that can detect anomalies. Machine learning model training may be performed using unsupervised learning techniques to train the machine learning model without historical time series data (e.g., as time series data is received for a training period, the time series data may be evaluated (e.g., without anomaly labeling) to train a machine learning model to detect anomalies.

As indicated at 530, a number of computing resources may be provisioned to apply the machine learning model to the time series data, the number of computing resources being determined based on an expected workload for the time series data, in some embodiments. For example, various features such as throughput, capacity, expected performance, type of machine learning model and/or resource may be used to determine expected workload. FIG. 6, discussed below, provides an example of a workload determination used to determine a number of resources, in some embodiments. Provisioning the resources may include obtaining or request the resources from a pool of available computing resources, in some embodiments. In some embodiments, the resources may be hosted separate from an anomaly detection system (e.g., in another service offered by a provider network).

As indicated at 540, anomaly detection for the time series data may be enabled using the provisioned number of computing resources applying the trained machine learning model to the time series data, according to some embodiments. For example, the trained model may be copied to and set up on the computing resources in order to be applied to further time series data. As indicated by the dotted line, training may be performed again, such as a re-training event as discussed above with regard to FIG. 4. As such, the number of computing resources may be re-determined and updated (if needed) to correspond to changes in, for example, the number of time series to be considered for anomaly detection, in some embodiments.

Expected workload for evaluating time series data may be determined in various ways. FIG. 6 illustrates a high-level flowchart of various methods and techniques to determine a number of computing resources for detecting anomalies from an expected workload, according to some embodiments. As indicated at 612, a number of time series to evaluate for anomalies may be identified. For example, the number of time series may be counted at data ingestion or provided in a request to enable anomaly detection. As indicated at 618, an inference performance commitment may be determined. For example, a user can select a minimum performance commitment, such as a Service Level Agreement (SLA) for anomaly detection when enabling anomaly detection or such a feature may be a default system value. Inference performance commitment may vary according to other features of anomaly detection (e.g., arrival time or intervals/batches of time series data to consider).

As indicated at 614, a training algorithm for machine learning model to detect anomalies may be identified as the computing resource type, as indicated at 616. For example, a utilized machine learning model technique, as well as type of compute instance, may be identified during training and assessing available computing resources. A throughput for a computing resource of the resource type for performing the training algorithm may be identified, as indicated at 620. For example, an index or other mapping of resource types and algorithms may be used or live performance data from machine learning model training may be collected.

As indicated at 630, a number of computing resources may be determined according to the number of time series to evaluate, throughput for a computing resource of the resource type and an inference performance commitment, by dividing the number of time series by the product of inference performance commitment multiplied by throughput). Non whole numbers may be rounded up, in some embodiments.

As indicated at 640, a buffer amount of computing resources may be added, in some embodiments. For example, a percentage multiplier may be added to the determined dumber at 630 (e.g., 30%, thus multiplying by 1.3). In some embodiments, a minimum number of computing resources may utilized, as indicated at 650. If not met, then, the number of computing resources may be increased to meet the minimum (e.g., a minimum of 3 instances), as indicated at 660.

Figure 7:
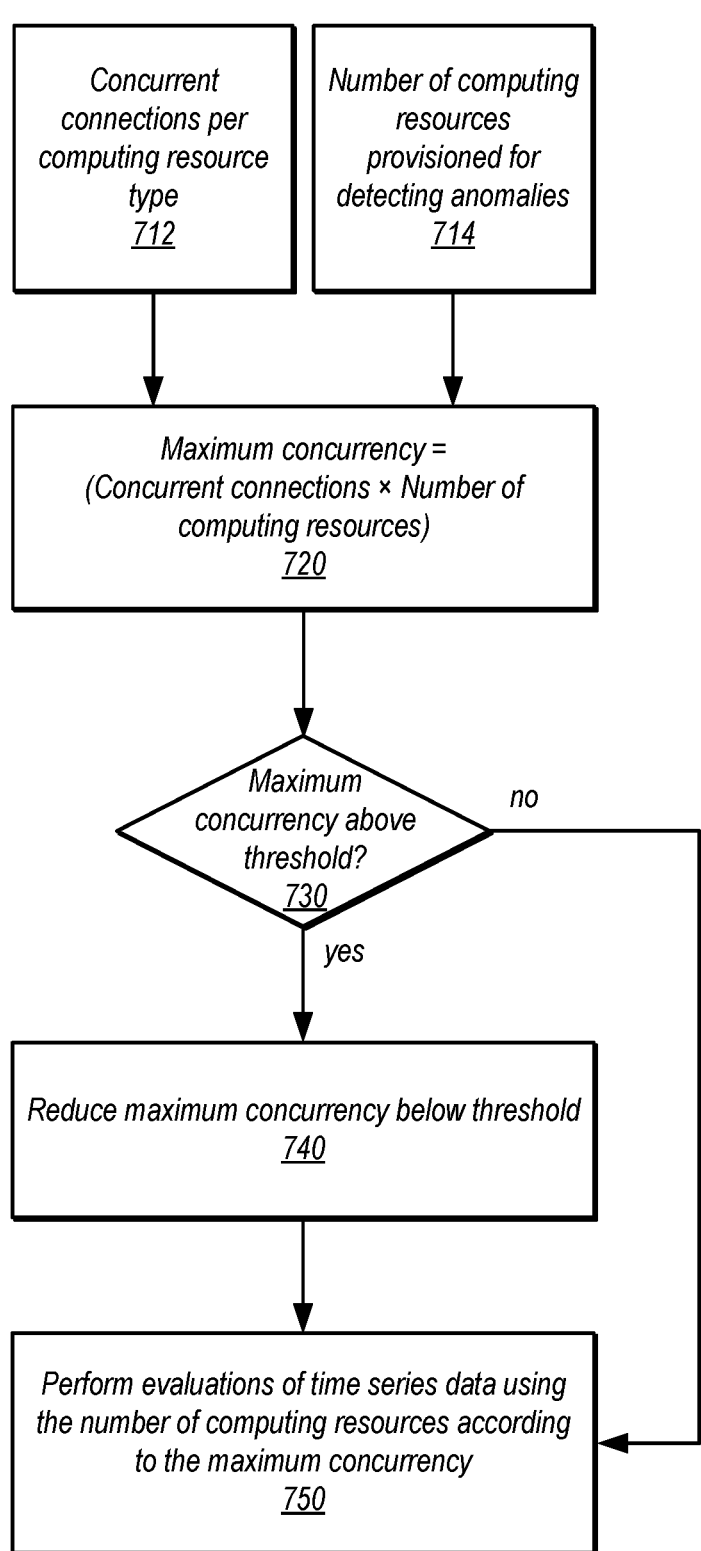
FIG. 7 illustrates a high-level flowchart of various methods and techniques to implement adjusting concurrent utilization of computing resources for detecting anomalies in time series data, according to some embodiments.

In some scenarios, managing the workload of provisioned computing resources may also include managing the number and/or rate of requests to be made to provisioned computing resources for anomaly detection. As the number of provisioned computing resources may change, so too may the strategies for managing the number and/or rate of requests to provisioned computing resources. FIG. 7 illustrates a high-level flowchart of various methods and techniques to implement adjusting concurrent utilization of computing resources for detecting anomalies in time series data, according to some embodiments.

As indicated at 712, a number of concurrent connections per computing resource type may be determined. For example, a virtual compute instance may support 5 concurrent connections for requests to generate anomaly detection inferences. As indicated at 714, a number of computing resources provisioned for detecting anomalies 714 may be determined, in some embodiments. For example, the number provisioned may be stored in a configuration file or other metadata for the time series data. As indicated at 720, a maximum concurrency may be determined. The maximum concurrency may be a result of multiplying concurrent connections times the number of computing resources, in some embodiments.

A maximum concurrency threshold may be applied, as indicated at 730, in some embodiments. A maximum concurrency threshold may, for example, be a tested or determined threshold value above which evidence for an anomaly detection system's performance indicates that concurrency yields less optimal performance. If, for instance, a number of connections is 5 and a number of computing resources is 15, then a maximum concurrency may be 75, which would be above a threshold 50 concurrent connections. In these scenarios, a maximum concurrency may be reduced according to various reduction techniques (e.g., recursively diving the maximum concurrency by 2 until less than the threshold), as indicated at 740. As indicated at 750, the reduced maximum concurrency (or maximum concurrency already below threshold), may be used to perform evaluations of time series data using the number of computing resources, in various embodiments.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
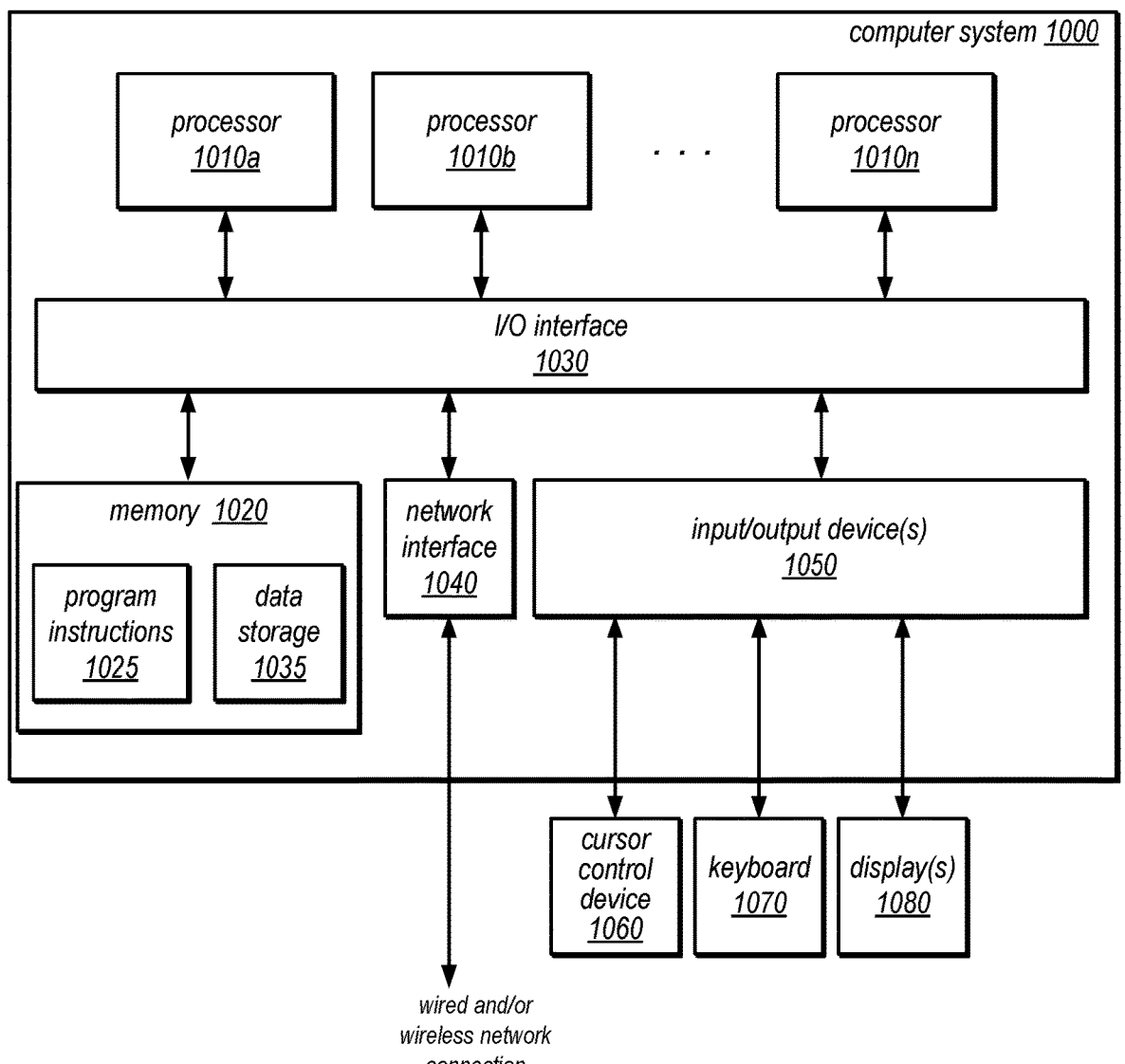
FIG. 8 illustrates an example system to implement the various methods, techniques, and systems described herein, according to some embodiments.

Embodiments of selecting subsets of prediction model creation techniques for time series forecasting as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical techniques. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one processor; and
a memory, storing program instructions that when executed by the at least one processor, cause the at least one processor to implement:
receive a request to enable anomaly detection using a machine learning model to detect anomalies in time series data, wherein the time series data comprises a plurality of series of data points;
cause the machine learning model to be trained to detect anomalies in the time series data that is to be received as input to the machine learning model;
determine a number of computing resources to be used to apply the machine learning model to detect the anomalies in the time series data, based, at least in part, on:
a first factor comprising a numerical value representing a minimum performance commitment for performing anomaly detection;
a second factor comprising a numerical value representing a compute capacity for an individual one of the computing resources to perform detection of the anomalies in the time series data using the machine learning model; and
a number of different series of data points in the plurality of series of data points to be evaluated by the machine learning model to detect the anomalies in the time series data, wherein the determined number of computing resources to be used is proportional to the number of different series of data points in the plurality of series of data points to be evaluated;
provision the determined number of computing resources to be used to apply the machine learning model to the time series data; and
enable the anomaly detection for the time series data using the provisioned number of computing resources by applying the trained machine learning model to the time series data, wherein the time series data is received as input to the machine learning model.

2. The system of claim 1, wherein to determine the number of computing resources to apply the machine learning model to the time series data, the program instructions cause the at least one processor to:
multiply the numerical value representing the minimum performance commitment for performing the anomaly detection by the numerical value representing the compute capacity for the individual computing resource to determine a result; and
divide the number of different series of data points in the time series data to be evaluated for anomalies by the result.

3. The system of claim 1, wherein the at least one memory stores further program instructions that when executed by the at last one processor, cause the at least one processor to provision a different number of computing resources for the time series data after the machine learning model is re-trained.

4. The system of claim 1, wherein the at least one processor and the memory are implemented as part of an anomaly detection service offered by a provider network and wherein the time series data is stored in a storage service offered by the provider network.

5. A method, comprising:
receiving, by an anomaly detection system, a request to enable anomaly detection using a machine learning model to detect anomalies in time series data, wherein the time series data comprises a plurality of series of data points;
training, by the anomaly detection system, the machine learning model to detect anomalies in the time series data that is to be received as input to the machine learning model;
provisioning, by the anomaly detection system, a number of computing resources to be used to apply the machine learning model to detect the anomalies in the time series data, the number of computing resources being determined based, at least in part, on:
a first factor comprising a numerical value representing a minimum performance commitment for performing anomaly detection;
a second factor comprising a numerical value representing a compute capacity for an individual one of the computing resources to perform detection of the anomalies in the time series data using the machine learning model; and
a number of different series of data points in the plurality of series of data points to be evaluated by the machine learning model to detect the anomalies in the time series data, wherein the determined number of computing resources to be used is proportional to the number of different series of data points in the plurality of series of data points to be evaluated; and
enabling, by the anomaly detection system, the anomaly detection for the time series data using the provisioned number of computing resources by applying the trained machine learning model to the time series data, wherein the time series data is received as input to the machine learning model.

6. The method of claim 5, further comprising determining the number of computing resources comprising:
multiplying the numerical value representing the minimum performance commitment for performing the anomaly detection by the numerical value representing the compute capacity for the individual computing resource to determine a result; and dividing the number of different series of data points in the time series data to be evaluated for anomalies by the result.

7. The method of claim 6, wherein determining the number of computing resources further comprises adding a buffer amount of computing resources.

8. The method of claim 6, wherein determining the number of computing resources further comprises raising an initially determined number of computing resources to a minimum number of computing resources.

9. The method of claim 5, further comprising provisioning a different number of computing resources for the time series data after the machine learning model is re-trained.

10. The method of claim 5, wherein enabling anomaly detection for the time series data using the provisioned number of computing resources applying the trained machine learning model to the time series data comprises determining a maximum concurrency threshold according to which evaluations of the time series data using the number of computing resources are performed.

11. The method of claim 5, wherein the number of computing resources are respective compute instances that host the machine learning model, and wherein the respective compute instances receive requests to evaluate the time series data via a network endpoint that distributes the requests to the respective compute instances.

12. The method of claim 5, wherein enabling anomaly detection for the time series data using the provisioned number of computing resources applying the trained machine learning model to the time series data comprises filtering out unknown series added to the time series data for evaluation using the trained machine learning model.

13. The method of claim 12, further comprising:

after re-training the machine learning model based on the unknown series, allowing evaluation of the unknown series using the trained machine learning model.

14. One or more non-transitory, computer-readable storage media, storing program instructions that when executed on or across one or more computing devices cause the one or more computing devices to implement:

receiving a request to enable anomaly detection using a machine learning model to detect anomalies in time series data, wherein the time series data comprises a plurality of series of data points;

causing the machine learning model to be trained to detect anomalies in the time series data that is to be received as input to the machine learning model;

causing a number of computing resources to be provisioned to be used to apply the machine learning model to detect the anomalies in the time series data, the number of computing resources being determined based, at least in part, on:

a first factor comprising a numerical value representing a minimum performance commitment for performing anomaly detection;

a second factor comprising a numerical value representing a compute capacity for an individual one of the computing resources to perform detection of the anomalies in the time series data using the machine learning model; and a number of different series of data points in the plurality of series of data points to be evaluated by the machine learning model to detect the anomalies in the time series data, wherein the determined number of computing resources to be used is proportional to the number of different series of data points in the plurality of series of data points to be evaluated; and enabling the anomaly detection for the time series data using the provisioned number of computing resources by applying the trained machine learning model to the time series data, wherein the time series data is received as input to the machine learning model.

15. The one or more non-transitory, computer-readable storage media of claim 14, storing further instructions that when executed by one or more computing devices, cause the one or more computing devices to further implement provisioning a different number of computing resources for the time series data after the machine learning model is re-trained.

16. The one or more non-transitory, computer-readable storage media of claim 14, wherein, in enabling anomaly detection for the time series data using the provisioned number of computing resources applying the trained machine learning model to the time series data, the program instructions cause the one or more computing devices to implement determining a maximum concurrency threshold according to which evaluations of the time series data using the number of computing resources are performed.

17. The one or more non-transitory, computer-readable storage media of claim 14, wherein, in enabling anomaly detection for the time series data using the provisioned number of computing resources applying the trained machine learning model to the time series data, the program instructions cause the one or more computing devices to implement filtering out unknown series added to the time series data for evaluation using the trained machine learning model.

18. The one or more non-transitory, computer-readable storage media of claim 14, storing further instructions that when executed by one or more computing devices, cause the one or more computing devices to further implement determining the number of computing resources by:

multiplying the numerical value representing the minimum performance commitment for performing the anomaly detection by the numerical value representing the compute capacity for the individual computing resource to determine a result; and dividing the number of different series of data points in the time series data to be evaluated for anomalies by the result.

19. The one or more non-transitory, computer-readable storage media of claim 18, wherein, in determining the number of computing resources, the program instructions cause the one or more computing devices to implement adding a buffer amount of computing resources.

20. The one or more non-transitory, computer-readable storage media of claim 14, wherein the one or more computing devices are implemented as part of an anomaly detection service offered by a provider network and wherein the time series data is stored in a storage service external to the provider network.

* * * * *